(12) United States Patent
Charrat

(10) Patent No.: US 8,620,214 B2
(45) Date of Patent: Dec. 31, 2013

(54) PROCESS FOR ESTABLISHING A DATA LINK BETWEEN TWO PROCESSORS, SPECIFICALLY WITHIN AN NFC CHIPSET

(75) Inventor: Bruno Charrat, Aix-en-Provence (FR)

(73) Assignee: Inside Secure, Aix-en-Provence Cedex (FR)

( * ) Notice: Subject to any disclaimer, the term of this patent is extended or adjusted under 35 U.S.C. 154(b) by 923 days.

(21) Appl. No.: 12/727,602

(22) Filed: Mar. 19, 2010

(65) Prior Publication Data

US 2010/0240303 A1    Sep. 23, 2010

(30) Foreign Application Priority Data

Mar. 20, 2009  (FR) ...................................... 09 01315

(51) Int. Cl.
*H04B 7/00* (2006.01)
(52) U.S. Cl.
USPC .......................................... 455/41.2; 455/558
(58) Field of Classification Search
USPC ............ 455/41.2, 41.3, 66.1, 558, 41.1, 74.1; 340/10.1
See application file for complete search history.

(56) References Cited

U.S. PATENT DOCUMENTS

| 6,073,855 | A | 6/2000 | MacKenthun |
| 6,724,103 | B2 * | 4/2004 | Parrault ........................ 307/104 |
| 2006/0103457 | A1 * | 5/2006 | Kumar et al. ................. 329/347 |
| 2008/0085001 | A1 | 4/2008 | Charrat et al. |
| 2008/0245851 | A1 | 10/2008 | Kowalski |

FOREIGN PATENT DOCUMENTS

| EP | 1 909 431 A1 | 4/2008 |
| FR | 2 914 800 A1 | 10/2008 |
| WO | WO 0039741 | * 7/2000 |
| WO | 02/01497 A1 | 1/2002 |
| WO | WO 2005020135 A1 * | 3/2005 |

* cited by examiner

*Primary Examiner* — Lewis West
(74) *Attorney, Agent, or Firm* — Panitch Schwarze Belisario & Nadel LLP

(57) ABSTRACT

A process for establishing a data link between a first processor configured to supply, upon a contact communication port, a first data carrying signal, and a second processor configured to supply, upon a contact communication port, a second data carrying signal is described. The process includes providing a first coupler and a second coupler, establishing a contactless coupling between the first and second couplers and, by the intermediary of the couplers and at least one RF signal, transferring the first data carrying signal to the second processor and transferring the second data carrying signal to the first processor. The second processor is, for example, a secure processor of a SIM card and the first processor is an NFC controller.

28 Claims, 7 Drawing Sheets

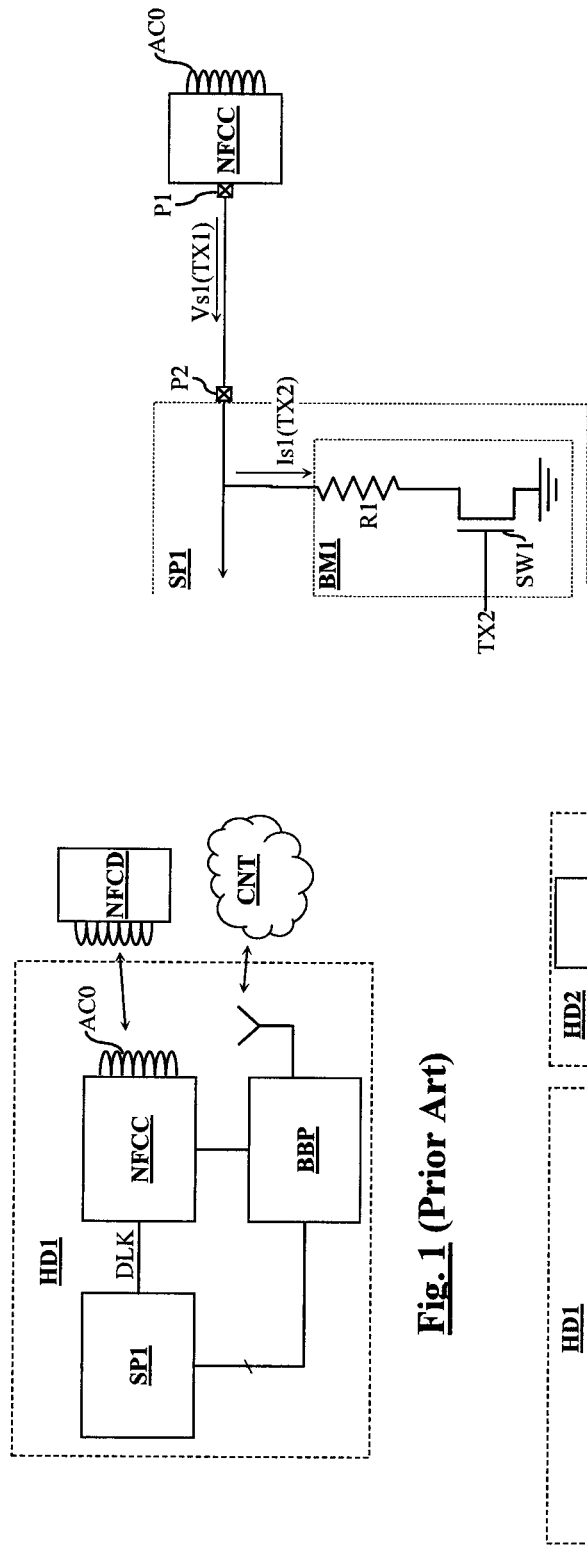

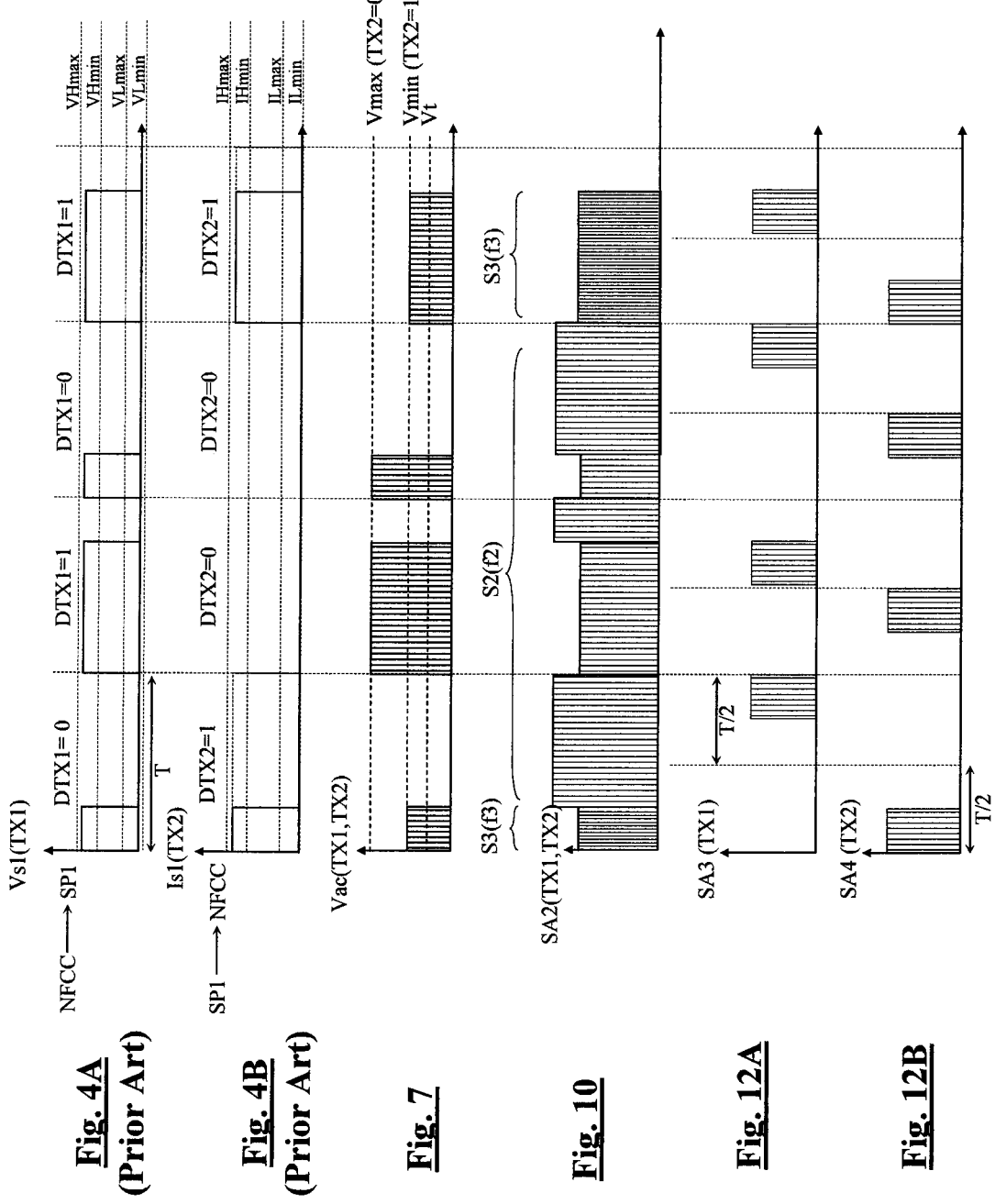

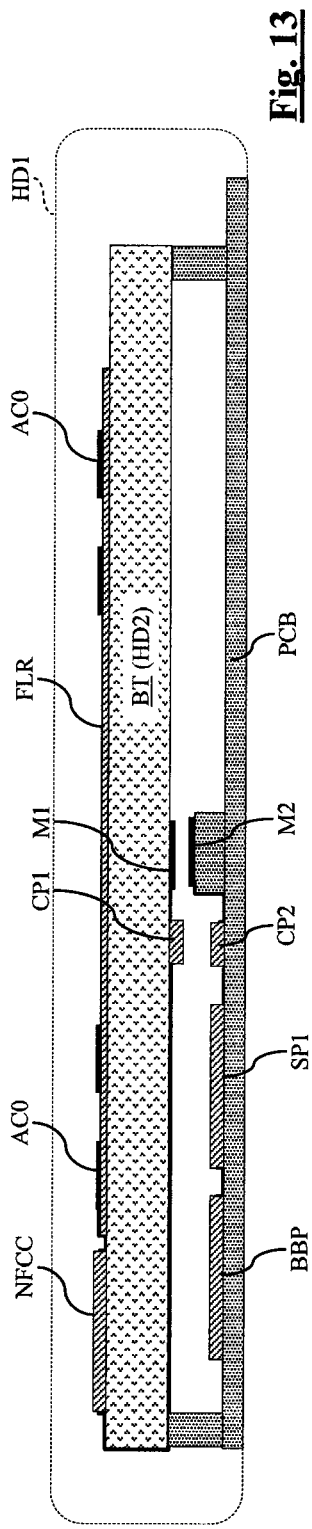
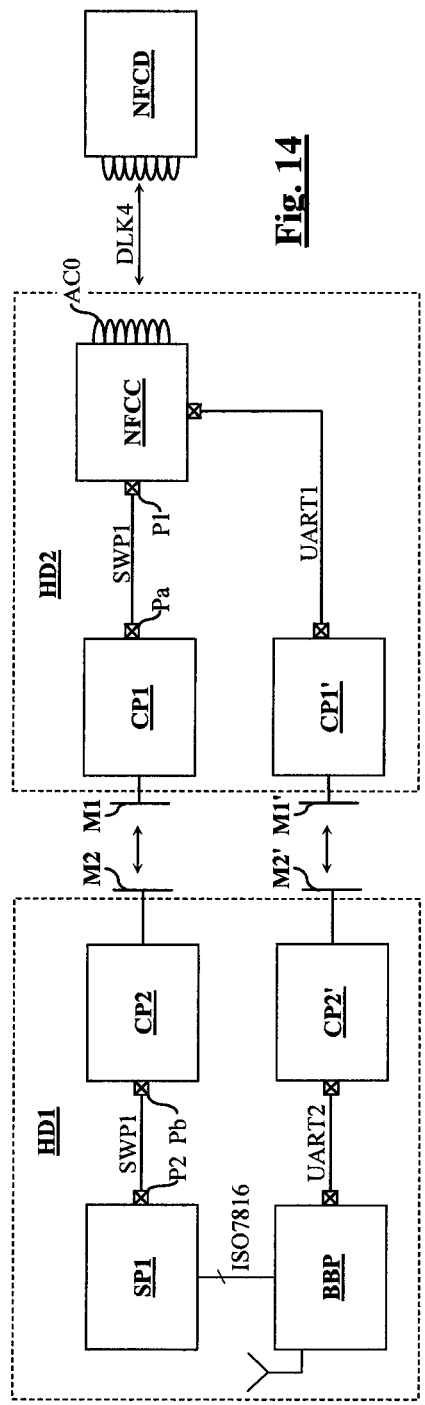
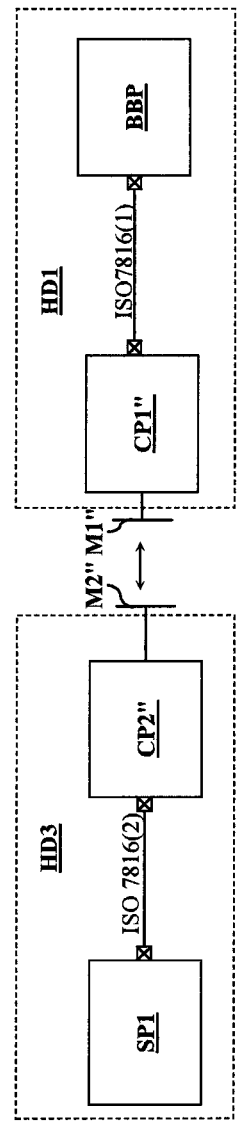
Fig. 13
Fig. 14
Fig. 15

PROCESS FOR ESTABLISHING A DATA LINK BETWEEN TWO PROCESSORS, SPECIFICALLY WITHIN AN NFC CHIPSET

BACKGROUND OF THE INVENTION

Embodiments of the present invention relate to a process for establishing a data link between two processors.

Embodiments of the present invention also relate, but not exclusively, to Near Field Communication (NFC) technology as well as to NFC chipset structures, i.e., groups of chips including at least one NFC component.

These past few years, industry has greatly invested in research and development of NFC technology in order to integrate NFC controllers within portable objects, such as mobile telephones or equivalent (for example, personal digital assistants (PDAs) equipped with a mobile telephone function). This allows such portable objects to be used for payment or access control (subway, bus, or the like). Furthermore, the user is offered all the other applications of NFC technology, such as the reading of tags or of contactless cards.

Certain applications, such as payment and access control, require a higher level of security. These applications need to be controlled by a secure processor having cryptographic functions for the authentication of the user and/or of the portable object with respect to a transaction terminal. Some mobile telephones already include a secure processor, such as the processor of a Subscriber Identity Module (SIM) card.

An important industrial issue thus arose from the very beginning of NFC technology, i.e., the question of whether the security of NFC applications should be entrusted to the processor of the SIM card or to a second secure processor that would be supplied by the NFC application providers.

Various different NFC chipset architectures dedicated to telephone applications were thus envisaged, some using the processor of the SIM card to manage the NFC applications, others provided with a second secure processor, or a combination of the above two solutions. FIG. 1 shows schematically an example NFC chipset architecture using a secure processor of a SIM card to manage the NFC applications. The NFC chipset is integrated in a portable device HD1 ("Handheld Device"), for example a mobile telephone, and includes a secure processor SP1 of the SIM card, a baseband processor BBP to establish a telephone communication via a cellular telephone network, and an NFC controller designated "NFCC", equipped with an antenna coil AC0, to receive and emit data by inductive coupling. Processor SP1 is linked to controller NFCC as a host processor by the intermediary of a data link functioning according to a specified protocol, for example the Single Wire Protocol (SWP). Baseband processor BBP is also connected to controller NFCC as a host processor, for example by an asynchronous link controlled by Universal Asynchronous Receiver Transmitter (UART) ports. If desired, processor SP1 can also be directly linked to baseband processor BBP by a bus ISO 7816.

In such an NFC chipset, secure processor SP1 ensures both the secure management of telephone connections with a cellular telephone network CNT and established by the processor BBP, and the security of NFC applications (payment, access control, or the like). During an NFC application, processor SP1 links itself to an external device NFCD by the intermediary of controller NFCC and by a contactless communication channel that controller NFCC establishes with the external device by inductive coupling.

A second secure processor can also be connected to controller NFCC as a third host processor to manage other NFC applications. Pursuant to a recent industrial agreement, it was decided that the SIM card will continue to be used to manage NFC applications, which explains the addition of an SWP port within the latest generation SIM cards, also known as "SIM-NFC" cards.

The deployment of NFC applications in mobile telephones is hindered by cost constraints. In fact, the integration of NFC controllers requires substantial modifications of the motherboards of mobile telephones, which in turn implicates considerable industrial investments and a significant increase in the cost price. Therefore, because of these factors, NFC technology remains confidential and will not be integrated within most mobile telephone models until the market demand is sufficient.

In order to offer NFC technology to the user without straining the cost price, an NFC architecture concept has been proposed that consists of "externalizing" the NFC controller by mounting it upon a support distinct from the motherboard of the telephone. This solution is schematically shown in FIG. 2. Processor SP1 and baseband processor BBP are mounted within mobile telephone HD1 and are conventionally linked by a bus ISO 7816, while the NFC controller is mounted within a distinct portable device HD2, for example a plastic card or sticker designed to be attached to the back of a mobile telephone. A contactless data link is established between processor BBP and the NFC controller, by emitters-receivers WL1, WL2 of Wifi or Bluetooth type. This contactless data link allows baseband processor BBP to be used to control NFC applications that are not secure but necessitate a large calculation power (for example, the reading of video or music files).

However, in such an NFC chipset architecture, processor SP1 of the SIM card is no longer linked to controller NFCC. A second secure processor SP2 is therefore added in device HD2. This second secure processor is connected to controller NFCC and is dedicated to NFC applications.

As the majority of mobile telephones are now equipped with an emitter-receiver of Wifi or Bluetooth type, such an NFC chipset architecture offers the advantage of not requiring any additional material cost for the fabrication of the motherboard of the mobile telephone, and only requires software.

However, the additional cost of emitter-receiver WL2 of Wifi or Bluetooth type within portable device HD2 is non-negligible, as well as the addition of the second processor SP2 to manage secure applications. The electrical consumption of emitter-receiver WL2 is also non-negligible and requires the provision, within device HD2, of a specific power source, such as a rechargeable battery and/or photovoltaic cells.

BRIEF SUMMARY OF THE INVENTION

Thus, embodiments of the present invention relate to a device and a process for achieving, in a simple and low-cost manner, a contactless data link between two processors, specifically between an NFC controller and a host processor of the NFC controller.

Embodiments of the present invention also relate to a device and a process for achieving an NFC chipset architecture in which an NFC controller is mounted upon a support distinct from that receiving the host processor, but in which a data link is established between the host processor and the NFC controller.

More particularly, embodiments of the present invention relate to a process for establishing a data link between a first processor and a second processor. The process includes, by the intermediary of a contact communication port of the first processor, emitting a first data carrying signal in the form of a first modulated signal; by the intermediary of a contact communication port of the second processor, emitting a second data carrying signal in the form of a second modulated signal; providing a first coupler and connecting the first coupler to the contact communication port of the first processor; providing a second coupler and connecting it to the contact communication port of the secure processor; establishing a contactless coupling between the first and second couplers; and by way of the couplers and of at least one RF signal, transferring the first data carrying signal to the contact communication port of the second processor and transferring the second data carrying signal to the contact communication port of the first processor.

According to one embodiment, the process includes, by way of the first coupler, receiving or sensing the first modulated signal, extracting from the first modulated signal the first data carrying signal and transferring the first data carrying signal to the second coupler by way of the RF signal; by way of the second coupler, receiving or sensing the second modulated signal, extracting from the second modulated signal the second data carrying signal and transferring the second data carrying signal to the first coupler by way of the RF signal or another RF signal, and receiving the first data carrying signal and supplying to the contact communication port of the second processor a third modulated signal that emulates the first modulated signal; and by way of the first coupler, receiving the second data carrying signal and supplying to the contact communication port of the first processor a fourth modulated signal that emulates the second modulated signal.

According to one embodiment, the process includes, by way of the first coupler, emitting the RF signal and modulating the RF signal such that the RF signal has a parameter that is modulated as a function of the first data carrying signal; by way of the second coupler, demodulating the RF signal in order to recover the first data carrying signal, and injecting in the RF signal a backscattered signal that has a parameter that is modulated as a function of the second data carrying signal; and by way of the first coupler, sensing the backscattered signal and demodulating the backscattered signal in order to recover the second data carrying signal.

According to one embodiment, the process includes, by ways of the second coupler, emitting the RF signal and modulating the RF signal such that the RF signal has a parameter that is modulated as a function of the second data carrying signal; by way of the first coupler, demodulating the RF signal in order to recover the second data carrying signal, and injecting in the RF signal a backscattered signal that has a parameter that is modulated as a function of the first data carrying signal; and by way of the second coupler, sensing the backscattered signal and demodulating the backscattered signal in order to recover the first data carrying signal.

According to one embodiment, the process includes, by way of the first coupler, emitting a first RF signal and modulating the first RF signal such that RF signal has a parameter that is modulated as a function of the first data carrying signal; by way of the second coupler demodulating the first RF signal in order to recover the first data carrying signal, and emitting a second RF signal and modulating the second RF signal such that the RF signal has a parameter that is modulated as a function of the second data carrying signal; and by way of the first coupler, demodulating the second RF signal in order to recover the second data carrying signal.

According to one embodiment, the first modulated signal is an electrically modulated voltage and the second modulated signal is a current signal modulated in the presence of the said electrically modulated voltage.

According to one embodiment, the first processor is an NFC controller that includes, in addition to the contact communication port, a contactless interface circuit functioning by inductive coupling, and the second processor is a host processor of the NFC controller.

According to one embodiment, the second processor is a secure processor of a SIM card.

According to one embodiment, the contactless coupling is an inductive coupling, an electrical field coupling, or a capacitive coupling.

Embodiments of the invention also relate to a process for conducting a transaction between the host processor of an NFC controller and an NFC device. The process includes establishing a data link between the host processor and the NFC device by way of the NFC controller, in which establishing a data link between the host processor and the NFC device includes establishing a data link between the host processor and the NFC controller according to the above-mentioned process.

Embodiments of the present invention also relate to a data processing and transfer device including a first processor configured to supply, upon a contact communication port, a first data carrying signal in the form of a first modulated signal, and a second processor configured to supply, upon a contact communication port, a second data carrying signal in the form of a second modulated signal. The device includes a first coupler connected to the contact communication port of the first processor, a second coupler connected to the contact communication port of the second processor. The couplers are coupled by a contactless coupling, and the first coupler is configured to receive or sense the first modulated signal, extract from the first modulated signal the first data carrying signal and transfer the first data carrying signal to the second coupler, by way of an RF signal. The second coupler is configured to receive or sense the second modulated signal, extract from the second modulated signal the second data carrying signal and transfer the second data carrying signal to the first coupler, by way of the RF signal or of another RF signal, and receive the first data carrying signal, and supply to the contact communication port of the second processor a third modulated signal that emulates the first modulated signal. The first coupler is also configured to receive the second data carrying signal and supply to the contact communication port of the first processor a fourth modulated signal that emulates the second modulated signal.

According to one embodiment, the first coupler is configured to emit the RF signal and modulate the RF signal such that the RF signal has a parameter that is modulated as a function of the first data carrying signal. The second coupler is configured to inject in the RF signal a backscattered signal that has a parameter that is modulated as a function of the second data carrying signal, demodulate the RF signal in order to recover the first data carrying signal. The first coupler is also configured to sense the backscattered signal and demodulate the backscattered signal in order to recover the second data carrying signal.

According to one embodiment, the second coupler is configured to emit the RF signal and modulate the RF signal such that the RF signal has a parameter that is modulated as a function of the second data carrying signal. The first coupler is configured to demodulate the RF signal in order to recover the second data carrying signal, and inject in the RF signal a backscattered signal that has a parameter that is modulated as a function of the first data carrying signal. The second coupler is also configured to sense the backscattered signal and demodulate the backscattered signal in order to recover the first data carrying signal.

According to one embodiment, the first coupler is configured to emit a first RF signal and modulate the first RF signal such that it has a parameter that is modulated as a function of the first data carrying signal. The second coupler is configured to demodulate the first RF signal in order to recover the first data carrying signal, and emit a second RF signal and modulate the second RF signal such that the second RF signal has a parameter that is modulated as a function of the second data carrying signal. The first coupler is also configured to demodulate the second RF signal in order to recover the second data carrying signal.

According to one embodiment, the first modulated signal is an electrically modulated voltage and the second modulated signal is a current signal modulated in the presence of the electrically modulated voltage.

According to one embodiment, the first processor is an NFC controller also includes a contactless interface circuit functioning by inductive coupling, and the second processor is a host processor of the NFC controller.

According to one embodiment, the first processor is an NFC controller also includes a contactless interface circuit functioning by inductive coupling, and the second processor is a baseband processor for a cellular telephone network.

According to one embodiment, the first processor is a baseband processor for a cellular telephone network, and the second processor is a secure processor of a SIM card.

According to one embodiment, the contactless coupling is an inductive coupling, an electrical field coupling, or a capacitive coupling.

Embodiments of the present invention also relate to a data processing and transfer device including a processor configured to supply, on at least one contact communication port, a first data carrying signal in the form of a first modulated signal. The device includes at least one coupler connected to the contact communication port of the processor, is configured for contactless coupling with another coupler, and is configured to receive or sense the first modulated signal, extract from the first modulated signal the first data carrying signal and transfer the first data carrying signal to the other coupler, by way of an RF signal; receive, by way of the other coupler, a second data carrying signal, by way of the RF signal or of another RF signal, and supply to the contact communication port of the processor a second modulated signal.

According to one embodiment, the coupler is configured to emit the RF signal and modulate the RF signal such that the RF signal has a parameter that is modulated as a function of the first data carrying signal, and sense a backscattered signal and demodulate the backscattered signal in order to recover the second data carrying signal.

According to one embodiment, the coupler is configured to receive and demodulate the RF signal in order to recover the second data carrying signal, and inject in the RF signal a backscattered signal that has a parameter that is modulated as a function of the first data carrying signal.

According to one embodiment, the coupler is configured to emit the RF signal and modulate the RF signal such that the RF signal has a parameter that is modulated as a function of the first data carrying signal, and receive and demodulate another RF signal in order to recover the second data carrying signal.

According to one embodiment, the first modulated signal is an electrically modulated voltage and the second modulated signal is a current signal modulated in the presence of the said electrically modulated voltage, or vice-versa.

According to one embodiment, the processor is an NFC controller also including a contactless interface circuit functioning by inductive coupling.

According to one embodiment, the processor is a secure processor of the SIM card.

According to one embodiment, the processor is a baseband processor for a cellular telephone network.

According to one embodiment, the contactless coupling is an inductive coupling, an electrical field coupling or a capacitive coupling.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Embodiments of the present invention will be described in greater detail in the following description, in connection with, but not limited to, the following in the drawings:

FIG. 1 shows an NFC chipset architecture example;

FIG. 2 shows another NFC chipset architecture example;

FIG. 3 shows a conventional data link, established according to the SWP protocol, between two processors;

FIGS. 4A, 4B are timing diagrams showing signals modulated according to the SWP protocol;

FIG. 7 is a timing diagram showing the form of an RF signal exchanged by the couplers of FIG. 6;

FIG. 10 is a timing diagram showing the form of an RF signal exchanged by the couplers of FIG. 9;

FIGS. 12A, 12B are timing diagrams showing the form of RF signals exchanged by the couplers of FIG. 11;

FIG. 13 schematically shows a mobile telephone comprising processors linked via contactless couplers;

FIG. 14 shows an example chipset architecture including processors lined via contactless couplers;

FIG. 15 shows another example chipset architecture including processors lined via contactless couplers.

DETAILED DESCRIPTION OF THE INVENTION

Figure 5A:
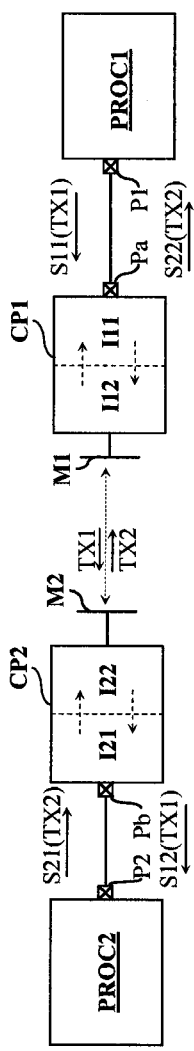
FIGS. 5A, 5B show schematically two contactless couplers according to embodiments of the invention and examples of utilization of these couplers to establish a data link between two processors.

FIG. 5A shows an example embodiment of a data link between two processors PROC1, PROC2, by two contactless couplers CP1, CP2. Processors PROC1, PROC2 were initially designed to be connected by a wire data link. To this effect, processor PROC1 is provided with a contact communication port P1 and processor PROC2 is provided with a contact communication port P2, ports P1 and P2 able to be interconnected. Processor PROC 1 emits upon port P1 a digital signal TX1 carrying data DTX1, in the form of a modulated signal Sm11(TX1). Similarly, processor PROC2 emits upon port P2 a digital signal TX2 carrying data DTX2, in the form of a modulated signal Sm21(TX2).

The form, nature and type of modulation of modulated signals Sm11 and Sm21 are conventionally determined by a physical protocol layer, such as a Layer 1 Protocol for Open Systems Interconnection, or OSI model. The form or profile of signals TX1, TX2 (the coding of data DTX1, DTX2) is determined by the physical layer protocol while the data DTX1, DTX2 that the signals TX1, TX2 contain and arrangement (dividing into frames; start of frame fields, end of frame fields, correction codes, and the like) are defined by a data link layer protocol (or Layer 2 of the OSI model, as well as higher layer protocols (application data).

It is reminded here that the physical layer protocol of a data transmission is generally in charge of the activation, maintenance, and deactivation of the physical link between the elements. The physical layer protocol determines the electrical specifications (voltage and current levels, timing, and coding of the voltage and current levels), the mechanical specifications (physical contacts) and the functional specifications (data flow). It also defines the initial establishment of the communication and the end of the communication. In addition, the data link layer protocol is responsible for the physical addressing of data through the frames and a Link Protocol Data Unit (LPDU). The data link layer protocol is also in charge of error notifications, frame status commands and flow control.

Instead of interconnecting ports P1 and P2, couplers CP1, CP2 are interposed between ports P1, P2. Coupler CP1 includes a port Pa connected to port P1 and coupler CP2 includes a port Pb connected to port P2. Coupler CP1 includes a contactless coupling M1 and coupler CP2 includes a contactless coupling M2. Couplings M1, M2 are, for example, inductive couplings, electrical field couplings, or capacitive couplings. The couplings M1, M2 allow data to be transferred from coupler CP1 to coupler CP2 and vice-versa, by the intermediary of at least one RF carrier.

Each coupler CP1, CP2 includes an emulation interface I11, I21 respectively, for emulation of the physical layer protocol used by processors PROC1, PROC2 and a contactless coupling interface I12, I22 connected to couplings M1, M2. Emulation interface I11 is connected to port Pa of coupler CP1. The emulation interface I11 receives or senses signal Sm11 emitted by port P1 of processor PROC1, extracts from signal Sm11 the data carrier signal TX1 and supplies the data carrier signal to coupling interface I12. Coupling interface I12 transfers signal TX1 to coupling interface I22 by the intermediary of couplings M1, M2.

Emulation interface I21 is connected to port Pb of coupler CP2. The emulation interface I21 receives or senses signal Sm21 emitted by port P2 of processor PROC2, extracts from signal Sm21 the data carrier signal TX2 and supplies the data carrier signal to coupling interface I22. Coupling interface I22 transfers signal TX2 to coupling interface I12 by the intermediary of couplings M1, M2.

Emulation interface I11 also supplies to port P1 of processor PROC1 a signal S22(TX2) that conveys data carrier signal TX2 and emulates signal S21(TX2) emitted by processor PROC2, while respecting the physical layer protocol for which port P1 is configured, so that processor PROC1 can function as if the processor PROC1 was connected directly to processor PROC2 and as if the processor PROC1 received signal S21(TX2).

Emulation interface I21 also supplies to port P2 a signal S12(TX1) that conveys data carrier signal TX1 and emulates signal S11(TX1) emitted by processor PROC1, while respecting the physical layer protocol for which port P2 is configured, so that processor PROC2 can function as if ports P1 and P2 were directly interconnected and as if the processor PROC2 received signal S11(TX1).

Couplers CP1, CP2 are therefore "transparent" with respect to processors PROC1, PROC2. The couplers CP1, CP2 ensure a Layer 1, or physical layer, coupling by exchanging signals TX1, TX2 without the addition of their own data link layer protocol (i.e., without the addition of start or end of frame data, without error correction, or the like). As it will later be described with the aid of examples, couplers CP1, CP2 use a contactless physical layer protocol of their own to exchange signals TX1, TX2, wherein this protocol includes the utilization of at least one RF carrier. This physical layer protocol can nevertheless be restored to its simplest expression. For example, in an embodiment, the physical layer protocol does not include any connection or disconnection conventions of the contactless physical layer between couplers CP1, CP2.

Figure 5B:
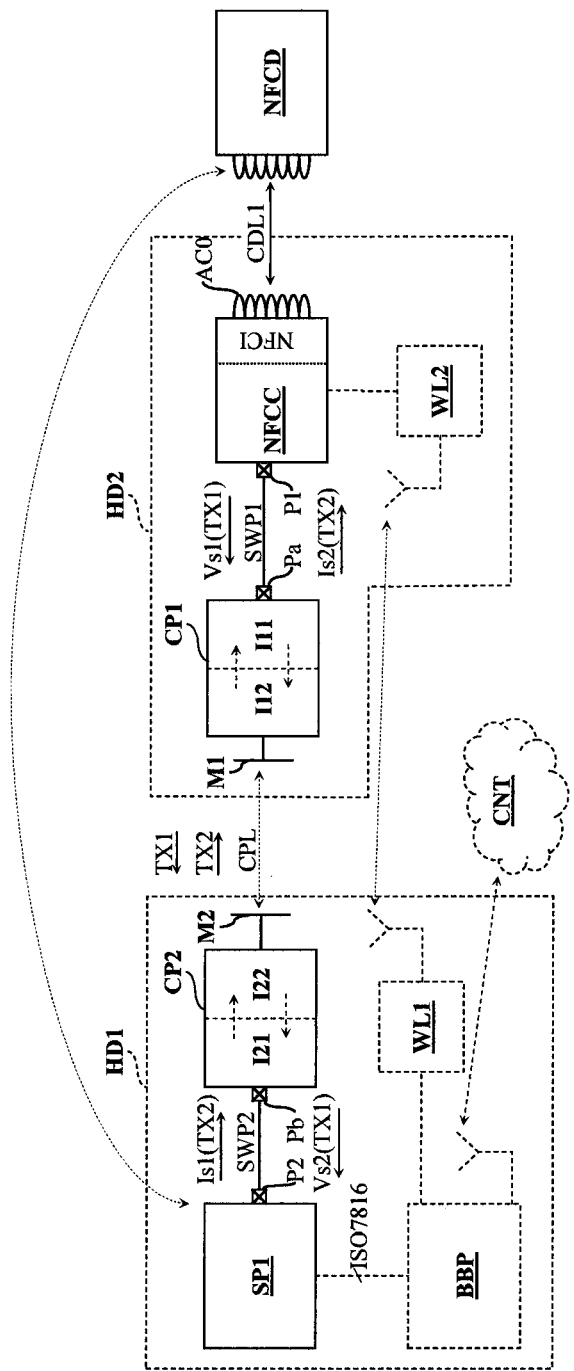

Couplers CP1, CP2 allow for the realization of original chipset architectures in the NFC domain or in the mobile telephone domain, for example, the architecture shown in FIG. 5B. In this application example, processor PROC1 is an NFC controller designated "NFCC". Processor PROC2 is a secure processor designated "SP1" of a SIM card. Controller NFCC is configured as a master device to manage a Single Wire Protocol (SWP) connection via port P1. Port P1 is therefore here a port with a single connection point forming an input/output of bidirectional (full-duplex) data. Similarly, processor SP1 is configured as a slave device to manage an SWP connection via port P2. It will be noted that for reasons of simplicity of the figure, the connection to ground between processors NFCC and SP1 is not shown.

Controller NFCC also includes a contactless interface circuit NFCI connected to an antenna coil AC0. Controller NFCC is configured to communicate with an external device NFCD, for example, a payment terminal, an access control terminal, an automatic teller machine, an electronic access gate, or the like. Controller NFCC is, for example, the controller "MicroRead" commercialized by the applicant, compatible with various protocols (e.g., ISO 14443 A&B, ISO 15693, ISO 18092), offering a communication distance on the order of 10 centimeters (cm), and including UART ports to connect host processors and an SWP interface port to connect a host processor of a SIM-NFC type card.

Thanks to couplers CP1, CP2, a contactless link is thus established between ports P1, P2. Master port P1 supplies a modulated voltage Vs1(TX1) to coupler CP1, and emulation interface I21 of coupler CP2 supplies to slave port P2 a modulated voltage Vs2(TX1) that emulates voltage Vs1 and conforms to the SWP physical layer protocol. Port P2 supplies a modulated current Is1(TX2) to coupler CP2, and interface I11 of coupler CP1 supplies to port P1 a modulated current Is2(TX2) that emulates current Is1(TX2) and conforms to the SWP physical layer protocol. Controller NFCC and processor SP1 can therefore exchange data as if their ports P1, P2 were directly interconnected.

As an application example, a contactless data link CDL1 is established between controller NFCC and external device NFCD to carry out a transaction with the aid of secure processor SP1. The latter can secure all or some of the transaction, at least the secure phases of the transaction, such as the authentication of processor SP1 with respect to device NFCD and/or the authentication of device NFCD with respect to processor SP1. To this effect, a data link is established between controller NFCC and host processor SP1. The data link includes a link SWP1 in conformance with the SWP specifications between controller NFCC and coupler CP1, a contactless link CPL between the two couplers CP1, CP2, and a link SWP2 in conformance with the SWP specifications between coupler CP2 and processor SP1. Processor SP1 can therefore exchange data with external device NFCD by the intermediary of a resulting data link that includes the two contactless links CDL1, CPL and the two wire links SWP1, SWP2. Link CDL1 differs from link CPL in that it has its own data link layer (for example, ISO 14443 A&B, ISO 15693, or ISO 18092). The management of the data link layer of link CDL1 is performed by controller NFCC, which is designed to this effect.

Embodiments of couplers CP1, CP2 provided to be connected to SWP ports will be described hereinafter.

As a reminder, the SWP protocol is described in the proposed industrial technical specification ETSI TS 102 613. The timing diagrams of FIGS. 4A, 4B show modulated signals intervening in a conventional SWP link such as that shown in FIG. 3, in which ports P1 and P2 of controller NFCC and of processor SP1 are interconnected. Voltage Vs1(TX1) emitted by host port P1 conveys signal TX1. The latter includes data DTX1 coded in the following manner: when DTX1=0, signal TX1 is at 1 during a fourth of the clock period, and is at 0 during the rest of the clock period. When DTX1=1, signal TX1 is at 1 during three-fourths of the clock period, and is at 0 during the last fourth of the clock period. Signal TX1 at 1 corresponds to a value of voltage Vs1 between two high voltages VHmax and VHmin. Signal TX1 at 0 corresponds to a value of voltage Vs1 between two low voltages VLmax and VLmin. Current Is1(TX2) is a current consumed or drawn by port P2 in the presence of voltage Vs1, and is not an emitted current. Current Is1(TX2) is therefore a backscattered signal that needs to be sensed. Current Is1 (TX2) conveys signal TX2. The latter includes data DTX2 coded in the following manner: when DTX2=1, signal TX2 is at 1. When DTX2=0, signal TX2 is at 0. Seen from the side of the master receiver (here the controller NFCC), TX2=1 corresponds to a current value between two high currents IHmax and IHmin, and TX2=0 corresponds to a current value between two low currents ILmax and ILmin. When TX2=1, the duration of the emission of current Is1 during period T can be equal to a fourth of a period or to three-fourths of a period because it depends on the duration of voltage Vs. Still as a reminder, FIG. 3 shows schematically an example of a backscatter circuit BM1 that could be provided within host processor SP1 to draw current Is1. Backscatter circuit BM1 is of an open drain type and includes, for example, a switch SW1 that links port P1 to ground by means of a resistor R1, switch SW1 being controlled by signal TX2.

Figure 6:
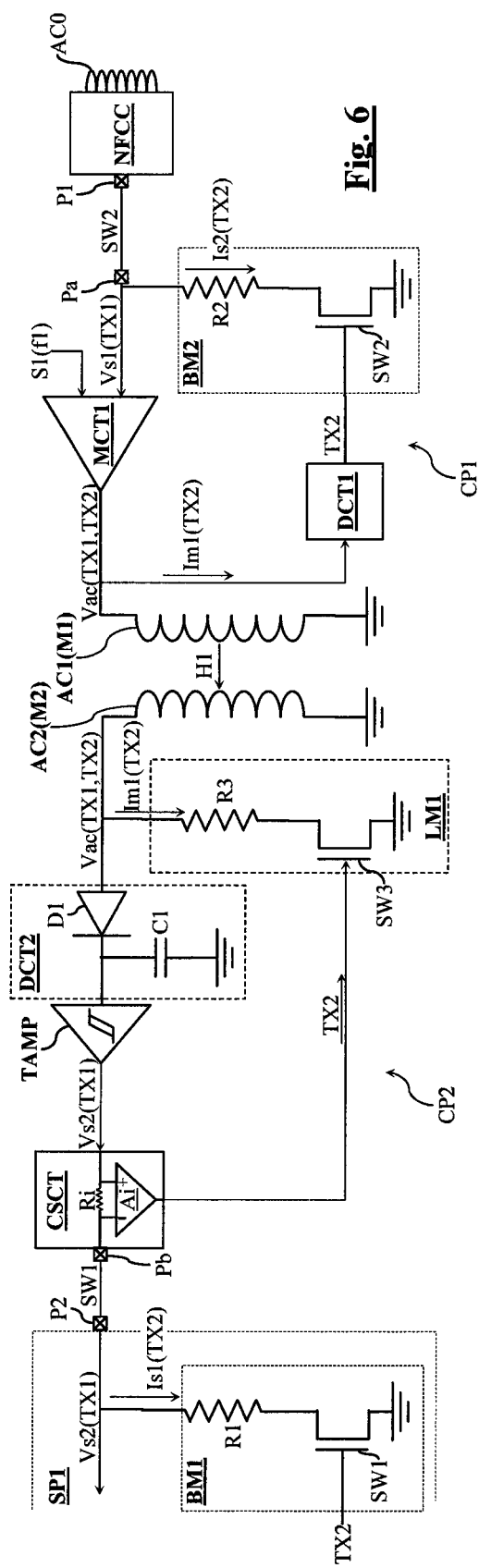
FIG. 6 shows an embodiment of the couplers of FIG. 5B.

FIG. 6 shows an embodiment of couplers CP1, CP2 in which coupling means M1, M2 are inductively coupled antenna coils AC1, AC2.

Coupler CP1 includes an RF modulator designated MCT1, a demodulator DCT1 and a current modulation emulation circuit BM2. Modulator MCT1 includes a first input receiving voltage Vs1(TX1) and connected to port P1, a second input receiving an RF signal S1(f1) of a frequency f1 supplied by an oscillator (not shown), and an output supplying to antenna coil AC1 an RF antenna signal Vac. Signal Vac is the result of the modulation of signal S1(f1) by voltage Vs1, for example, an amplitude modulation, and has a modulated parameter, here its amplitude, that conveys data carrier signal TX1. Antenna coil AC1 thus emits a modulated magnetic field H1 of frequency f1. To avoid interferences with the magnetic field emitted by interface NFCI of controller NFCC, frequency f1 is preferably different than that used by controller NFCC (FIGS. 5A, 5B). If this latter is for example 13.56 MHz (ISO 14443 A&B, ISO 15693, ISO 18092), frequency f1 is for example chosen to be greater than a hundred MHz.

Demodulator DCT1 is connected to antenna coil AC1 and is configured to extract, after filtering of the RF carrier, from antenna signal Vac a backscatter signal Im1(TX2) conveying signal TX2 and emitted by coupler CP2. The output of demodulator DCT1 supplies signal TX2 to the current modulation emulation circuit BM2. Circuit BM2 has here the same structure as circuit BM1 of processor SP1 (Cf. FIG. 3 or FIG. 6), and includes a switch SW2 linking port Pa to ground by way of a resistor R2. Switch SW2 is controlled by signal TX2 supplied by demodulator DCT1. Controller NFCC thus sees modulated current Is2(TX2), which emulates current Is1 (TX2), appear upon port P1.

Antenna signal Vac is reflected by inductive coupling with antenna coil AC2 of coupler CP2. This latter includes an RF demodulator DCT2, an amplifier TAMP, a current sense circuit CSCT and a load modulation circuit LM1. Demodulator DCT2 has one input connected to antenna coil AC2 to receive modulated antenna signal Vac, and an output supplying data carrier signal TX1 to amplifier TAMP. In the embodiment where modulator MCT1 performs a simple amplitude modulation of signal Vac, demodulator DCT2 can simply include a half-wave rectifying diode and a capacitor C1 that filters the RF carrier of frequency f1 in order to conserve only the envelope of signal Vac, corresponding to the profile of voltage Vs1, that is signal TX1.

Amplifier TAMP thus receives signal TX1 of which the profile corresponds to the profile of voltage Vs1, and supplies voltage Vs2(TX1) that emulates voltage Vs1(TX1). Amplifier TAMP is, for example, a regulated voltage amplifier having a threshold voltage Vt and a switching hysteresis to generate net voltage edges between VHmax and VHmin, as well as when processor SP1 consumes current Is1(TX2) on port P2.

The current sense circuit CSCT is arranged between the output of amplifier TAMP and port Pb of the coupler, which is connected to port P2 of processor SP1. Circuit CSCT is provided to sense current Is1 drawn by processor SP2 and to extract from current Is1 the data carrier signal TX2, which circuit CSCT provides to load modulation circuit LM1.

It will be noted here that since Is1 is a backscatter current of which the duration depends upon the duration of voltage Vs2 (that is ¼ or ¾ of period T), the profile of current Is(TX2) and the profile of signal TX2 can be appreciably different. In FIG. 6, it can be seen that TX2 is applied by processor SP1 upon a control terminal of switch SW2 (for example the gate of a metal-oxide-semiconductor (MOS) transistor. In an embodiment, the duration of TX2 can thus be a complete clock cycle while the duration of current Is1 is only one-fourth or three-fourths of the clock period, depending upon the duration of voltage Vs2. In other embodiments, the duration of TX2 can be chosen by convention to be three-fourths of the clock cycle, or even less (a duration of ¼ of the clock cycle allows for the transfer of data DTX2). Therefore, when it is indicated in this description and in the claims that coupler CP2 is configured to "sense the modulated signal Is1 and to extract from the modulated signal Is1 the data carrier signal TX2", this indication is approximate and the said extraction of the data carrier signal can correspond to several embodiments:

the extracted signal TX2 is, in reality, not exactly identical to the initial signal TX2 (such as applied to the switch SW1) and its profile corresponds to the profile of current Is1; or the extracted signal TX2 is identical to the initial signal TX2 and its profile does not correspond to the profile of current Is1. In this case, circuit CSCT needs to be configured to prolong the duration of signal TX2=1 in such a manner that to cover the duration of signal TX2 provided by convention, for example, three-fourths of the clock cycle.

Finally, load modulation circuit LM1 includes, for example, a switch SW3 that links a terminal of antenna coil AC2 to ground, by the intermediary of a resistor R3. Switch SW3 is controlled by signal TX2 supplied by the current sense circuit CSCT and causes a backscatter current Im1 (TX2) to appear within antenna signal Vac. The backscatter current is reflected by inductive coupling in antenna coil AC1 and is recovered by demodulator DCT1.

FIG. 7 shows the profile of antenna signal Vac as a function of modulated signals Vs1(TX1) and Is1(TX2). It can be seen that signal Vac is doubly modulated, its envelope is the same as voltage Vs1(TX1), but has sub-modulations of amplitude Vmax, Vmin that are functions of current Is1(TX2). In order that these sub-modulations do not modify the amplitude of the emulated voltage Vs2 supplied to processor SP1, amplifier TAMP can be configured to have a threshold voltage Vt that is inferior to the amplitude modulation extremes Vmax, Vmin, which only depend upon current Is1.

This embodiment of couplers CP1, CP2, functioning by inductive coupling, can be transformed into a capacitive coupling embodiment by replacing antenna coils AC1, AC2 with capacitive coupling plates, or transformed into an electrical field coupling embodiment by replacing antenna coils AC1, A2 by electrical field antennas. In these implementation variations, the modulation of signal S1 by means of voltage Vs1 to supply signal Vac, can be done in various other manners, notably by phase modulation (Binary Phase Shift Keying (BPSK)), by frequency modulation (Frequency Shift Keying (FSK)), or the like. Equally, the emission of signal TX2 by charge modulation via load modulation circuit LM1, can be performed in numerous other ways, notably by phase modulation of a sub-carrier, frequency modulation by two sub-carriers, or the like.

Figure 8:
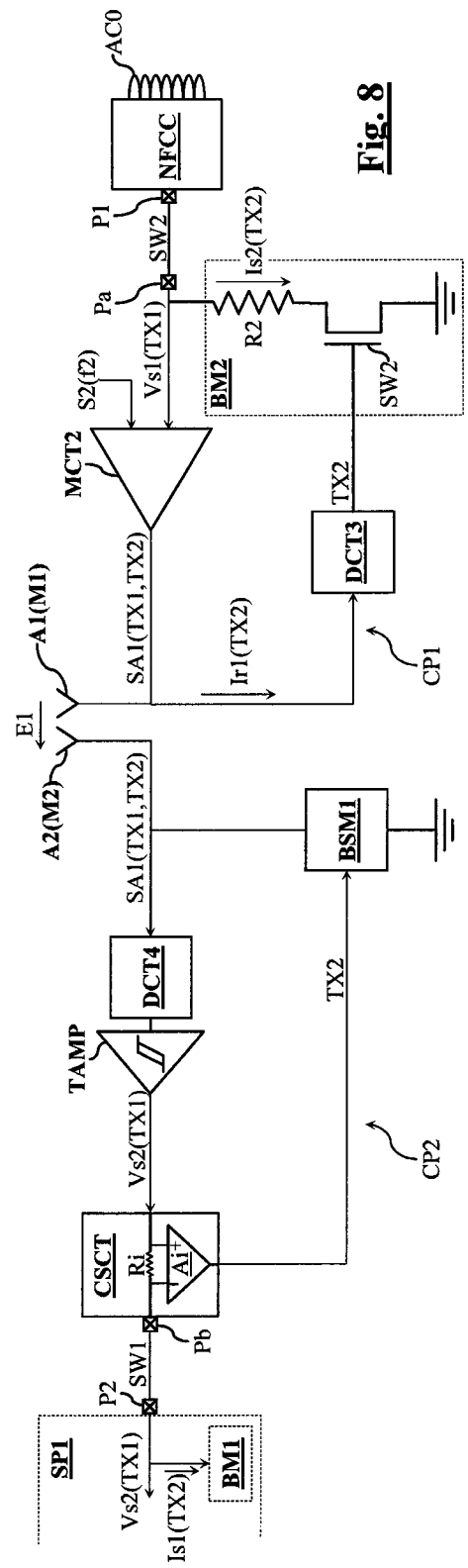
FIG. 8 shows another example embodiment of the couplers of FIG. 5B.

FIG. 8 shows an embodiment of couplers CP1, CP2 according to the principle of electrical field coupling. Antenna coils AC1, AC2 are replaced by electrical field antennas A1, A2, for example, dipolar antennas. Modulator MCT1 of coupler CP1 is replaced by a modulator MCT2 that receives, instead of signal S1, an RF signal S2 of which the frequency f2 is situated in the UHF domain, for example a frequency on the order of several hundred megahertz to several gigahertz. Modulator circuit MCT2 supplies to antenna A1 an antenna signal SA1 that is modulated as a function of signal Vs1(TX1) and is reflected within antenna A2 by electrical coupling.

Load modulation circuit LM1 of coupler CP2 is replaced by a backscatter circuit BSM1 that modulates the reflection coefficient of antenna A2 in order to perform a backscattering. More particularly, circuit BSM1 receives signal TX2 as supplied by the current sense circuit CSCT and converts signal TX2 into a modulation of the reflection coefficient of antenna A2. This causes a backscattered signal Ir(TX2) to appear within antenna A1, and the backscattered signal is mixed with antenna signal SA1.

Finally, demodulator DCT1 of coupler CP1 is replaced by a demodulator DCT3 configured to extract the backscattered signal Ir1, and the RF demodulator DCT2 of coupler CP2 is replaced by an RF demodulator DCT4 configured to filter the frequency f2 and extract signal TX1 from antenna signal SA1.

In the embodiment shown in FIG. 6, antenna coil AC1 emits the magnetic field H1, and in the embodiment shown in FIG. 8, antenna A1 emits the electrical field E1. Coupler CP1 is therefore active and coupler CP2 is passive in these two embodiments. In other embodiments, it can be provided that coupler CP2 is active and coupler CP1 is passive. The provision of the RF emission from the coupler CP2 side of the device can be advantageous in certain applications such as that shown in FIG. 5B. Indeed, in this application coupler CP2 can be arranged in a mobile telephone (HD1) with a powerful battery allowing the RF signal to be generated without the available energy reserve being greatly affected. On the contrary, in other applications, as will be described later in relation with FIG. 13, coupler CP2 is arranged in proximity to the battery of a mobile telephone.

Figure 9:
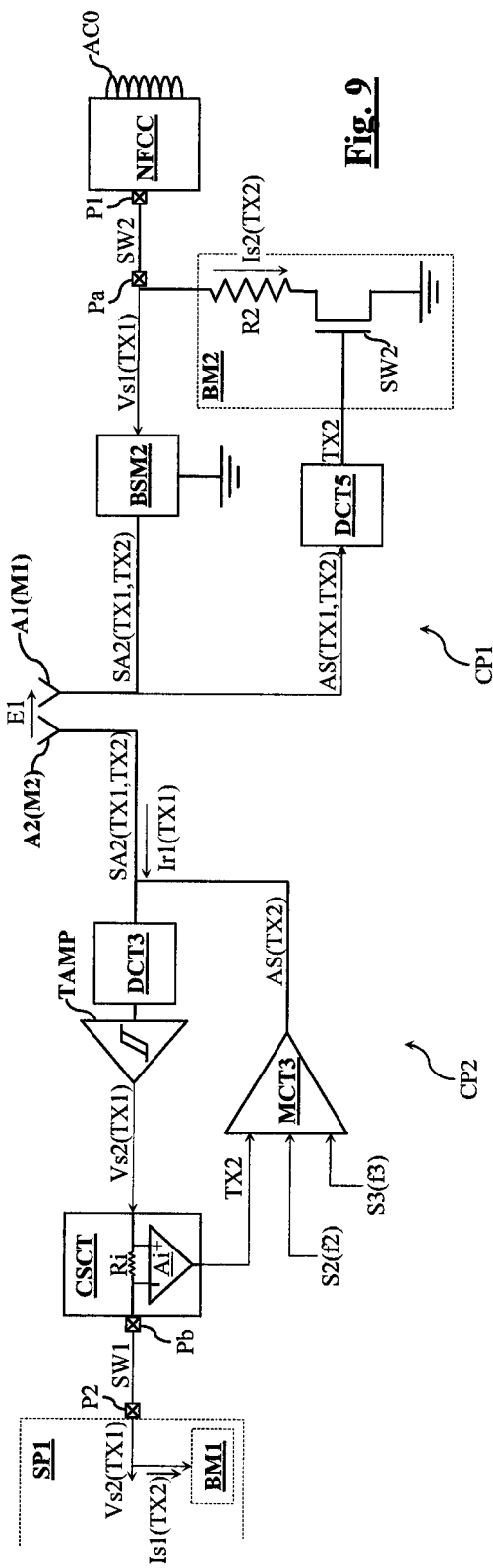
FIG. 9 shows yet another example embodiment of the couplers of FIG. 5B.

FIG. 9 shows an embodiment in which coupler CP1 is passive and coupler CP2 is active and emits the electrical field E1. Signal TX1 is transmitted to coupler CP2 by backscattering while signal TX2 is transmitted to coupler CP1 by active emission of the electrical field E1.

This embodiment requires a particular precaution so that the transmission by backscattering of all the rising edges of signal TX1 is not omitted. According to the SWP protocol, these edges are in fact used as a clock signal by processor SP1. To this effect, coupler CP2 is equipped with an RF modulator MCT3 that receives signal TX2 (such as supplied by the circuit CSCT) and supplies to antenna A2 an uninterrupted antenna signal SA2. Antenna signal SA2 does not have a modulation period where its amplitude is zero. Moreover, signal TX2 is preferably transmitted by using an RF modulation technique by phase shifting BPSK (a single carrier) or of RF frequency modulation FSK (two carriers). These techniques avoid the creation in the carrier of amplitude modulation holes, which could alter the reception of the clock edges.

Modulator MCT3 shown in FIG. 9 is of the FSK type. It receives two carriers S2(f2), S3(13) of frequencies f2 and f3 respectively, and which are situated in the UHF domain, for example. Values 0 and 1 of signal TX2 are coded in the form of frequency modulation either by direct coding (the 0 being coded by the frequency f1, the 1 by frequency f2, or reciprocally) or by Manchester type coding (the 0 being coded by an alternating f1-f2 of two frequencies, the 1 being coded by an inverse alternating f2-f1, or reciprocally).

A backscattering circuit BSM2 is arranged here within coupler CP1. Circuit BSM2 receives voltage Vs1(TX1) and converts it into a modulation of the reflection coefficient of antenna A1, causing a backscattering signal Ir(TX1) to appear in antenna A2. The backscatter signal mixes with antenna signal SA2. Demodulator DCT3 is here arranged in coupler CP2, and is configured to filter and demodulate the backscattered signal generated by circuit BSM2. The demodulator DCT3 output supplies signal TX1 to amplifier TAMP, the output of which supplies signal Vs2(TX1) to port P2 of processor SP1. Finally, an RF demodulator DCT5 is arranged in coupler CP1 to decode the FSK modulation (detection of jumps of frequencies f1-f2 or f2-f1) and to extract from it signal TX2, which is then applied to the current modulation emulation circuit BM2.

FIG. 10 shows the profile of antenna signal AC2 as a function of the modulated signals Vs1(TX1) and Is1(TX2). As desired, signal AC2 is uninterrupted and has the frequency f1 when Is1=1 and the frequency f2 when Is2=0 (direct coding). The amplitude of signal AC2 is modulated as a function of voltage Vs1(TX1), as an effect of the backscattering circuit BSM2. The amplitude of signal SA2 has here a lower maximum value when Vs1=1 and a higher maximum value when Vs1=0.

Figure 11:
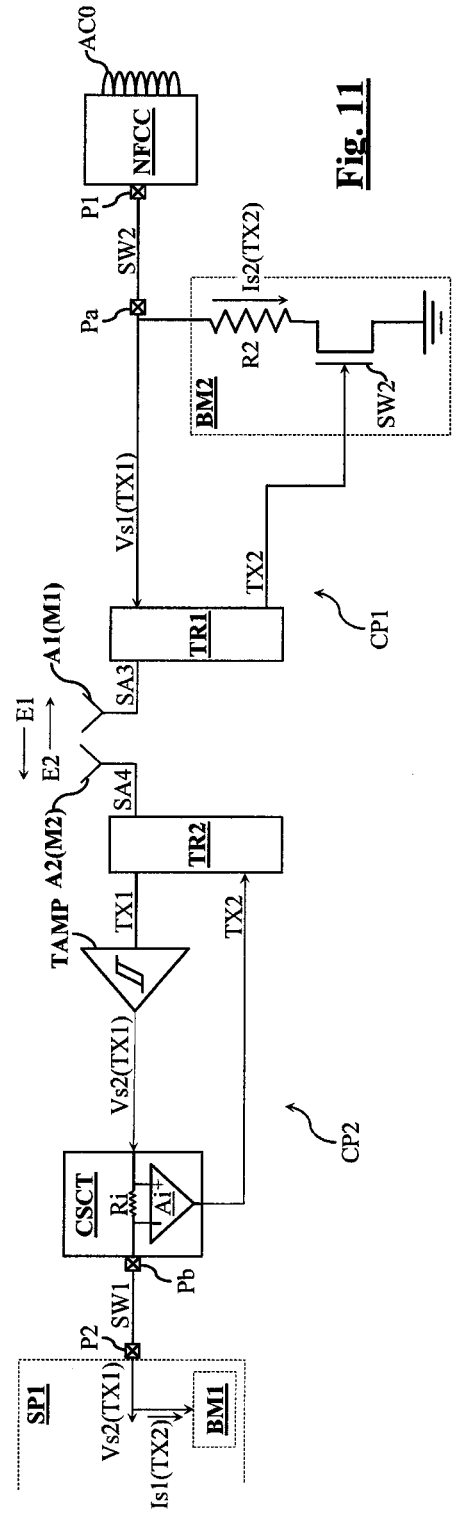
FIG. 11 shows yet another example embodiment of the couplers of FIG. 5B.

FIG. 11 shows an embodiment in which the two couplers are active. Coupler CP1 includes an RF emitter-receiver TR1 that emits an electrical field E1 and coupler CP2 includes an RF emitter-receiver TR2 that emits an electrical field E2. This embodiment does not require backscattering because each coupler modulates the electrical field that it emits as a function of the signals TX1, TX2 to be emitted. Thus, emitter-receiver TR1 receives voltage Vs1(TX1) and applies to antenna A1 an antenna signal SA3 that it modulates as a function of signal TX1 (amplitude modulation, of phase or of frequency), so that the antenna emits the electrical field E1. Emitter-receiver TR2 receives signal TX2 such as supplied by the current sense circuit CSCT and applies to antenna A2 an antenna signal SA4 that is modulated as a function of signal TX2, so that the antenna emits the electrical field E2. Emitter-receiver TR1 also receives electrical field E2 and demodulates electrical field E2 to supply signal TX2 to the current modulation emulation circuit BM2. Reciprocally, emitter-receiver TR2 receives electrical field E1 and demodulates electrical field E1 to supply signal TX1 to amplifier TAMP.

Each antenna A1, A2 thus receives the antenna signal SA3, SA4, one being supplied thereto, the other being received by coupling. The differentiation of fields E1, E2 and of the corresponding antenna signals SA3, SA4 can be done either in the frequency domain or in the time domain. In the first case, signals SA3, SA4 have different frequencies and can be separated by an appropriate filtration. Different antennas could also be provided in each coupler to emit field E1 or E2 on the one hand, and to receive field E2 or E1 emitted by the other coupler on the other hand. In this second case, fields E1, E2 are emitted in alternation, and the transmission of signals TX1, TX2 is conducted in a unidirectional mode (half-duplex) instead of being done in a bidirectional mode (full-duplex). Emitter-receiver TR2 is silent while emitter-receiver TR1 emits field E1, and then performs the demodulation of the received antenna signal SA3. Then, emitter-receiver TR1 is silent while emitter-receiver TR2 emits field E2, and then performs the demodulation of the received antenna signal SA4.

FIGS. 12A, 12B show the transmission of signals TX1, TX2 in alternating unidirectional mode and show respectively the antenna signal SA3(TX1) and the antenna signal SA4(TX2). Signal SA4 is emitted during the first half-period of signal Vs1(TX1), clock period T being supplied by signal Vs. Signal SA3 is emitted during the second half-period of the clock. The emission of signals TX1, TX2 can be performed in any known manner, for example by Manchester coding by an RF signal with a single carrier, as shown in FIGS. 12A, 12B. In this case, signal TX1=0 is coded during the second half-period by an absence of field E1 emission during a fourth of a period, followed by a field emission during the remaining fourth of a period. Inversely, signal TX1=1 is coded during the second half-period by a field emission during a fourth of a period, followed by an absence of field emission during the remaining fourth of a period. In a similar manner, signal TX2=0 is coded during the first half-period by an absence of field E2 emission during a fourth of a period, followed by a field emission during the remaining fourth of a period. Signal TX2=1 is coded during the first half-period by a field emission during a fourth of a period, followed by an absence of field emission during the remaining fourth of a period.

FIG. 13 shows, very schematically, an application example of couplers CP1, CP2 in a mobile telephone HD1. The telephone includes a motherboard PCB upon which is mounted the baseband processor BBP, the secure processor SP1 of the SIM card, the coupler CP2 and the coupling means M2. Processor SP1 is connected to baseband processor BBP and to coupler CP2 by the intermediary of a SIM card insertion slot and an electrical connector, which are not shown here for reasons of simplicity. The telephone also includes a removable battery BT forming a portable support HD2. Battery BT receives controller NFCC and its antenna coil AC0, as well as coupler CP1. Antenna coil AC0 is optionally arranged upon a ferrite layer FLR, which is magnetically conductive in order to isolate the battery and the motherboard PCB from the magnetic field generated by the antenna coil. Coupling M1 is arranged on the rear face of battery BT in order to be opposite coupling M2. Couplings M1, M2 are, for example, capacitive coupling plates or antenna coils. Thus, processor SP1 can establish a data link (for example by SWP) with controller NFCC, by the intermediary of couplers CP1, CP2.

This application example has the advantage of allowing the integration of an NFC controller in a mobile telephone without substantial modifications of the architecture of the motherboard of the telephone—only coupler CP2 and coupling means M2 need to be added. Mobile telephone batteries can thus be commercialized with an NFC fitting.

With reference to FIG. 5B, the utilization of couplers CP1, CP2 to link processor SP1 and controller NFCC does not exclude the provision of a wireless link between baseband processor BBP and controller NFCC by emitter-receivers WL1, WL2 such as Wifi or Bluetooth type. Processor SP1 also can be linked to baseband processor BBP via a bus ISO 7816.

It will clearly appear to the skilled person that couplers according to the invention are susceptible of numerous variations and embodiments. As previously indicated, the data transfer by coupling, by means of an RF carrier, can be based upon various known modulation techniques, that is to say amplitude modulation, phase modulation (BPSK), frequency modulation (FSK), etc.

In the previously described figures, the current sense circuit CSCT includes a resistor Ri with a low value, to transform current Is1 into a voltage, as well as a differential amplifier Ai connected to the terminals of resistor Ri. The output of the amplifier supplies signal TX2. Other embodiments of circuit CSCT can be provided by the skilled person, notably embodiments including a current mirror and not introducing any loss of voltage proportional to the current traversing circuit CSCT.

Couplers according to embodiments of the invention are also susceptible of various other applications. For example, as shown in FIG. 14, contactless couplers CP1'-CP2' can be used to link baseband processor BBP to controller NFCC. Coupler CP1' is connected to a UART port of controller NFCC and emulates an asynchronous bus UART1 while coupler CP2' is connected to a UART port of baseband processor BBP and emulates an asynchronous bus UART2, such that processors BBP and NFCC exchange data as if their UART ports were directly linked by a wire link.

As shown in FIG. 15, contactless couplers CP1", CP2" can also be used in a "non-NFC" application, for example, to link processor SP1 of the SIM card to baseband processor BBP, with emulation of the bus ISO 7816 by the couplers. In this case, coupler CP1" is connected to the I/O port of baseband processor BBP and emulates a link ISO 7816(1) and coupler CP2" is connected to the I/O port of processor SP1 and emulates a link ISO 7816(2), such that processors SP1 and BBP exchange data as if directly linked by a wire bus ISO 7816.

Figure 16:
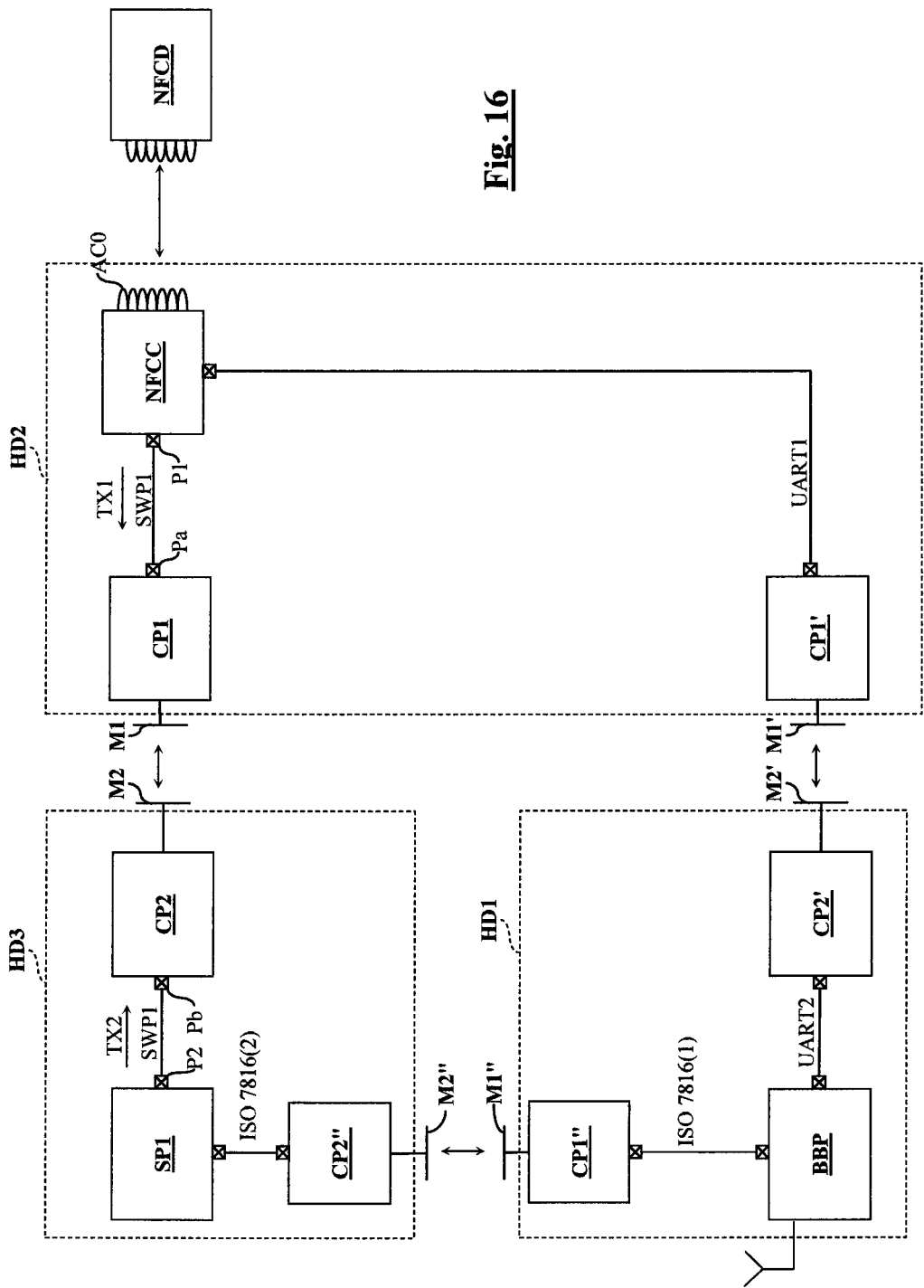
FIG. 16 shows another example chipset architecture including processors linked via contactless couplers.

FIG. 16 shows an NFC chipset including processors SP1, BBP and controller NFCC, as well as the previously described couplers SP1, SP2, SP1', SP2', SP1", SP2". Baseband processor BBP is mounted upon a first portable support HD1, controller NFCC is mounted upon a second portable support HD2 and processor SP1 is mounted upon a third portable support HD3. Processor SP1 is linked to controller NFCC by the intermediary of couplers CP1, CP2 and a bus SWP. Controller NFCC is linked to processor BBP by the intermediary of couplers CP1', CP2' and an asynchronous bus of UART type. Processor BBP is linked to processor SP1 by the intermediary of couplers CP1", CP2" and a bus ISO 7816.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A process for establishing a data link between a first processor and a second processor, comprising:
    by intermediary of a contact communication port of the first processor, emitting a first data carrying signal in the form of a first modulated signal;
    by intermediary of a contact communication port of the second processor, emitting a second data carrying signal in the form of a second modulated signal;
    providing a first coupler and connecting the first coupler to the contact communication port of the first processor;
    providing a second coupler and connecting the second coupler to the contact communication port of the second processor;
    establishing a contactless coupling between the first and second couplers; and
    by way of the couplers and of at least one RF signal, transferring the first data carrying signal to the contact communication port of the second processor and transferring the second data carrying signal to the contact communication port of the first processor.

2. The process according to claim 1, further comprising:
    by way of the first coupler, receiving or sensing the first modulated signal, extracting from the first modulated signal the first data carrying signal, and transferring the first data carrying signal to the second coupler by means of the RF signal;
    by way of the second coupler, receiving or sensing the second modulated signal, extracting from the second modulated signal the second data carrying signal, transferring the second data carrying signal to the first coupler by way of the RF signal or another RF signal, and receiving the first data carrying signal and supplying to the contact communication port of the second processor a third modulated signal that emulates the first modulated signal; and
    by way of the first coupler, receiving the second data carrying signal and supplying to the contact communication port of the first processor a fourth modulated signal that emulates the second modulated signal.

3. The process according to claim 2, further comprising:
    by way of the first coupler, emitting the RF signal and modulating the RF signal such that the RF signal has a parameter that is modulated as a function of the first data carrying signal;
    by way of the second coupler, demodulating the RF signal in order to recover the first data carrying signal, and injecting in the RF signal a backscattered signal that has a parameter that is modulated as a function of the second data carrying signal; and
    by way of the first coupler, sensing the backscattered signal and demodulating the backscattered signal in order to recover the second data carrying signal.

4. The process according to claim 2, further comprising:
    by way of the second coupler, emitting the RF signal and modulating the RF signal such that the RF signal has a parameter that is modulated as a function of the second data carrying signal;
    by way of the first coupler, demodulating the RF signal in order to recover the second data carrying signal, and injecting in the RF signal a backscattered signal that has a parameter that is modulated as a function of the first data carrying signal; and
    by way of the second coupler, sensing the backscattered signal and demodulating the backscattered signal in order to recover the first data carrying signal.

5. The process according to claim 2, further comprising:
    by way of the first coupler, emitting a first RF signal and modulating the first RF signal such that the first RF signal has a parameter that is modulated as a function of the first data carrying signal;
    by way of the second coupler, demodulating the first RF signal in order to recover the first data carrying signal, and emitting a second RF signal and modulating the second RF signal such that the second RF signal has a parameter that is modulated as a function of the second data carrying signal; and
    by way of the first coupler, demodulating the second RF signal in order to recover the second data carrying signal.

6. The process according to claim 1, in which the first modulated signal is an electrically modulated voltage and the second modulated signal is a current signal modulated in the presence of the electrically modulated voltage.

7. The process according to claim 1, in which:
    the first processor is an NFC controller that comprises, in addition to the contact communication port, a contactless interface circuit functioning by inductive coupling, and
    the second processor is a host processor of the NFC controller.

8. The process according to claim 1, in which the second processor is a secure processor of a SIM card.

9. The process according to claims 1, in which the contactless coupling is an inductive coupling, an electrical field coupling or a capacitive coupling.

10. A process for conducting a transaction between the host processor of an NFC controller and an NFC device, comprising establishing a data link between the host processor and the NFC device by way of the NFC controller, wherein the establishing of the data link between the host processor and the NFC device comprises establishing a data link between the host processor and the NFC controller according to the process of claim 1.

11. A data processing and transfer device having a first processor configured to supply, upon a contact communication port, a first data carrying signal in the form of a first modulated signal, and a second processor configured to supply, upon a contact communication port, a second data carrying signal in the form of a second modulated signal, the device comprising:
    a first coupler connected to the contact communication port of the first processor;
    a second coupler connected to the contact communication port of the second processor,
    wherein the couplers are coupled by a contactless coupling, and the first coupler is configured to:

receive or sense the first modulated signal, extract from the first modulated signal the first data carrying signal and transfer the first data carrying signal to the second coupler by way of an RF signal, the second coupler is configured to:

receive or sense the second modulated signal, extract from the second modulated signal the second data carrying signal and transfer the second data carrying signal to the first coupler by way of the RF signal or of another RF signal, receive the first data carrying signal, and supply to the contact communication port of the second processor a third modulated signal that emulates the first modulated signal, and the first coupler is also configured to:

receive the second data carrying signal and supply to the contact communication port of the first processor a fourth modulated signal that emulates the second modulated signal.

12. The data processing and transfer device according to claim 11, wherein the first coupler is further configured to:

emit the RF signal and modulate the RF signal such that the RF signal has a parameter that is modulated as a function of the first data carrying signal, the second coupler is further configured to:

inject in the RF signal a backscattered signal that has a parameter that is modulated as a function of the second data carrying signal, demodulate the RF signal in order to recover the first data carrying signal, and the first coupler is also further configured to:

sense the backscattered signal and demodulate the backscattered signal in order to recover the second data carrying signal.

13. The data processing and transfer device according to claim 11, wherein the second coupler is further configured to:

emit the RF signal and modulate the RF signal such that the RF signal has a parameter that is modulated as a function of the second data carrying signal, the first coupler is further configured to:

demodulate the RF signal in order to recover the second data carrying signal, inject in the RF signal a backscattered signal that has a parameter that is modulated as a function of the first data carrying signal, and the second coupler is also further configured to:

sense the backscattered signal and demodulate the backscattered signal in order to recover the first data carrying signal.

14. The data processing and transfer device according to claim 11, wherein the first coupler is further configured to:

emit a first RF signal and modulate the first RF signal such that the first RF signal has a parameter that is modulated as a function of the first data carrying signal, the second coupler is further configured to:

demodulate the first RF signal in order to recover the first data carrying signal, emit a second RF signal and modulate the second RF signal such that the second RF signal has a parameter that is modulated as a function of the second data carrying signal, and the first coupler is also further configured to:

demodulate the second RF signal in order to recover the second data carrying signal.

15. The data processing and transfer device according to claim 11, wherein the first modulated signal is an electrically modulated voltage and the second modulated signal is a current signal modulated in the presence of the said electrically modulated voltage.

16. The data processing and transfer device according to claim 11, wherein the first processor is an NFC controller also comprising a contactless interface circuit functioning by inductive coupling, and the second processor is a host processor of the NFC controller.

17. The data processing and transfer device according to claim 11, wherein the contactless coupling is an inductive coupling, an electrical field coupling or a capacitive coupling.

18. A data processing and transfer device having a first processor configured to supply, upon a contact communication port, a first data carrying signal in the form of a first modulated signal, and a second processor configured to supply, upon a contact communication port, a second data carrying signal in the form of a second modulated signal, the device comprising:

a first coupler connected to the contact communication port of the first processor;

a second coupler connected to the contact communication port of the second processor, wherein the couplers are coupled by a contactless coupling, and the first coupler is configured to:

receive or sense the first modulated signal, extract from the first modulated signal the first data carrying signal and transfer the first data carrying signal to the second coupler by way of an RF signal, the second coupler is configured to:

receive or sense the second modulated signal, extract from the second modulated signal the second data carrying signal and transfer the second data carrying signal to the first coupler by way of the RF signal or of another RF signal, receive the first data carrying signal, and supply to the contact communication port of the second processor a third modulated signal that emulates the first modulated signal, and the first coupler is also configured to:

receive the second data carrying signal and supply to the contact communication port of the first processor a fourth modulated signal that emulates the second modulated signal, and wherein:

the first processor is an NFC controller also comprising a contactless interface circuit functioning by inductive coupling, and the second processor is a baseband processor for a cellular telephone network.

19. A data processing and transfer device having a first processor configured to supply, upon a contact communication port, a first data carrying signal in the form of a first modulated signal, and a second processor configured to supply, upon a contact communication port, a second data carrying signal in the form of a second modulated signal, the device comprising:

a first coupler connected to the contact communication port of the first processor;

a second coupler connected to the contact communication port of the second processor, wherein the couplers are coupled by a contactless coupling, and the first coupler is configured to:

receive or sense the first modulated signal, extract from the first modulated signal the first data carrying signal and transfer the first data carrying signal to the second coupler by way of an RF signal, the second coupler is configured to:
receive or sense the second modulated signal, extract from the second modulated signal the second data carrying signal and transfer the second data carrying signal to the first coupler by way of the RF signal or of another RF signal, receive the first data carrying signal, and supply to the contact communication port of the second processor a third modulated signal that emulates the first modulated signal, and the first coupler is also configured to:
receive the second data carrying signal and supply to the contact communication port of the first processor a fourth modulated signal that emulates the second modulated signal, and wherein:
the first processor is a baseband processor for a cellular telephone network, and
the second processor is a secure processor of a SIM card.

20. A data processing and transfer device having a processor configured to supply, on at least one contact communication port, a first data carrying signal in the form of a first modulated signal, the device comprising:
at least one coupler connected to the contact communication port of the processor, the at least one coupler being configured for contactless coupling with another coupler, and configured to:
receive or sense the first modulated signal, extract from it the first data carrying signal and transfer the first data carrying signal to the other coupler, by way of an RF signal,
receive, by way of the other coupler, a second data carrying signal, by way of the RF signal or of another RF signal, and supply to the contact communication port of the processor a second modulated signal.

21. The data processing and transfer device according to claim 20, wherein the coupler is further configured to:
emit the RF signal and modulate the RF signal such that the RF signal has a parameter that is modulated as a function of the first data carrying signal, and sense a backscattered signal and demodulate the backscattered signal in order to recover the second data carrying signal.

22. The data processing and transfer device according to claim 20, wherein the coupler is configured to:
receive and demodulate the RF signal in order to recover the second data carrying signal, and
inject in the RF signal a backscattered signal that has a parameter that is modulated as a function of the first data carrying signal.

23. The data processing and transfer device according to claim 20, wherein the coupler is further configured to:
emit the RF signal and modulate the RF signal such that the RF signal has a parameter that is modulated as a function of the first data carrying signal, and receive and demodulate another RF signal in order to recover the second data carrying signal.

24. The data processing and transfer device according to claim 20, wherein the first modulated signal is one of an electrically modulated voltage or a current signal modulated in the presence of the electrically modulated voltage and the second modulated signal is the other of the electrically modulated voltage of the current signal modulated in the presence of the electrically modulated voltage.

25. The data processing and transfer device according to claim 20, wherein the processor is an NFC controller also comprising a contactless interface circuit functioning by inductive coupling.

26. The data processing and transfer device according to claim 20, wherein the processor is a secure processor of a SIM card.

27. The data processing and transfer device according to claim 20, wherein the processor is a baseband processor for a cellular telephone network.

28. The data processing and transfer device according to claim 20, wherein the contactless coupling is an inductive coupling, an electrical field coupling, or a capacitive coupling.

* * * * *